United States Patent
Dickinson

(10) Patent No.: US 10,035,469 B2
(45) Date of Patent: Jul. 31, 2018

(54) CARRIER FOR A VEHICLE

(75) Inventor: Martin Dickinson, Northampton (GB)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 927 days.

(21) Appl. No.: 14/124,574

(22) PCT Filed: Jun. 28, 2012

(86) PCT No.: PCT/GB2012/000564
§ 371 (c)(1),
(2), (4) Date: May 2, 2014

(87) PCT Pub. No.: WO2012/168687
PCT Pub. Date: Dec. 13, 2012

(65) Prior Publication Data
US 2014/0239027 A1    Aug. 28, 2014

(30) Foreign Application Priority Data

Jun. 6, 2011 (GB) .................................. 1109390.3

(51) Int. Cl.
    *B60R 9/06* (2006.01)
(52) U.S. Cl.
    CPC ....................................... *B60R 9/06* (2013.01)
(58) Field of Classification Search
    CPC . B60R 9/06; B60R 9/10; B60P 7/0823; B60P 7/0846; B60P 7/083; Y10S 24/909; Y10S 224/924; B60D 1/185; B65H 54/585; B65H 75/4471; Y10T 24/2175
    USPC .......................................................... 224/572
    See application file for complete search history.

(56) References Cited

U.S. PATENT DOCUMENTS

| 4,809,953 | A | * | 3/1989 | Kurita | ................... | B60P 7/0838 |
| | | | | | | 24/68 CD |
| 6,047,451 | A | * | 4/2000 | Berger | ................. | A44B 11/125 |
| | | | | | | 24/68 CD |
| 2003/0188401 | A1 | * | 10/2003 | Huang | ................. | B60P 7/0838 |
| | | | | | | 24/193 |
| 2004/0104380 | A1 | * | 6/2004 | Huang | ................. | A44B 11/125 |
| | | | | | | 254/218 |

(Continued)

FOREIGN PATENT DOCUMENTS

| CA | 2089946 | 5/1994 |
| DE | 10016376 | 10/2001 |
| EP | 0104155 | 3/1984 |

OTHER PUBLICATIONS

International Search Report for PCT/GB2012/000564, C.P. Witter Limited, dated Aug. 10, 2012, 2 pages.

*Primary Examiner* — Justin Larson
*Assistant Examiner* — Matthew Theis
(74) *Attorney, Agent, or Firm* — McDonald Hopkins LLC

(57) ABSTRACT

A carrier for use in carrying items externally on a vehicle is disclosed having: a rack upon which the items may be mounted which, in use, is supported by the vehicle in such a manner that the rack extends away from the vehicle and that the weight of the rack and any items carried thereon bears against the vehicle; a plurality of straps, each connected at a proximal end to the rack and having, at a distal end, a catch to enable engagement of the strap with the vehicle; wherein tension in a pair of the straps is simultaneously adjustable by means of a movable handle located on the rack, wherein motion of the handle causes retraction of each strap of the pair.

16 Claims, 14 Drawing Sheets

(56) References Cited

U.S. PATENT DOCUMENTS

2010/0181357 A1    7/2010   Christianson
2011/0068138 A1*   3/2011   Flaherty .................... B60R 9/06
                                                                           224/324

* cited by examiner

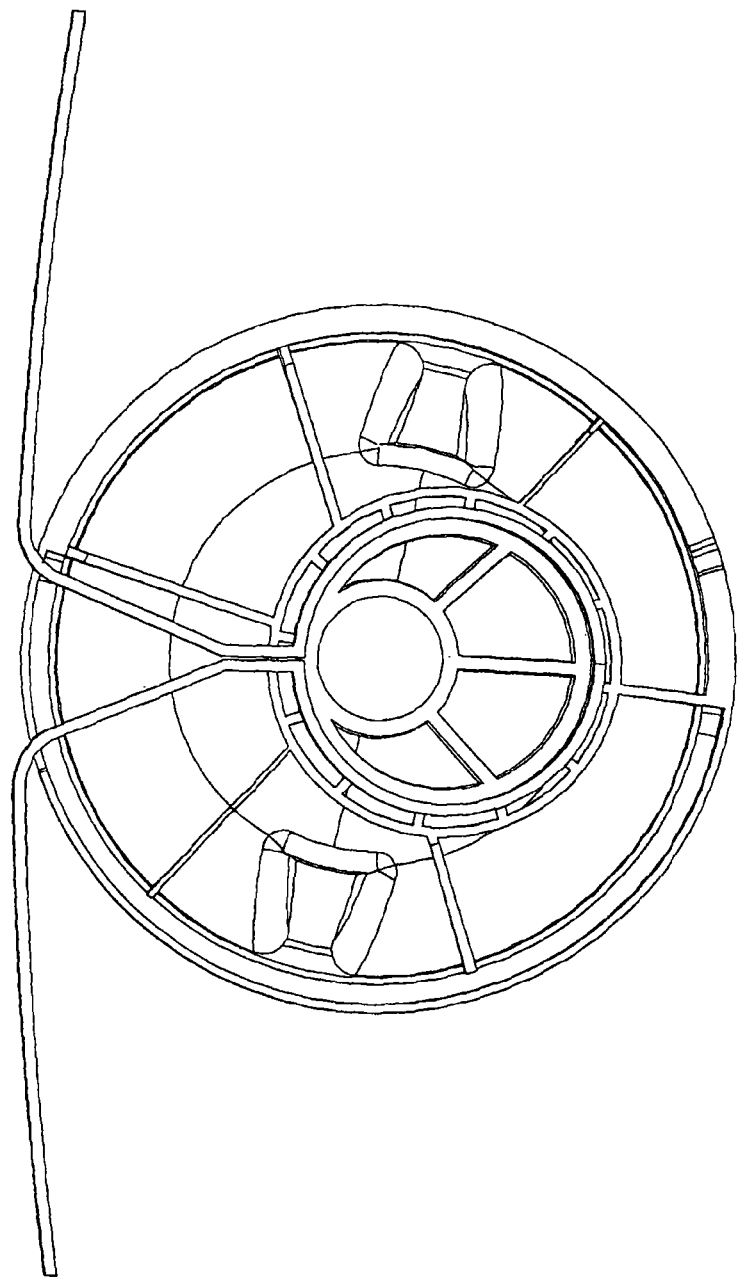

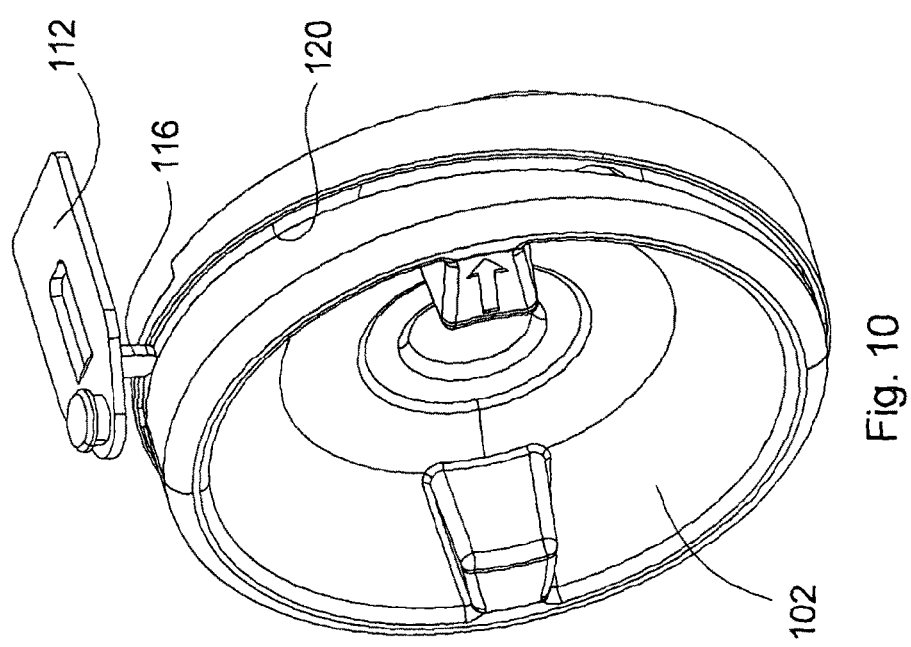

CARRIER FOR A VEHICLE

CROSS-REFERENCE TO RELATED APPLICATION(S)

This application is the National Stage of International Application No. PCT/GB2012/00564, filed Jun. 28, 2012, which claims benefit from GB Patent Application No. 1109390.3 entitled "Carrier for a Vehicle" filed on Jun. 6, 2011, all of which are hereby incorporated in their entirety by reference.

BACKGROUND TO THE INVENTION

1. Field of the Invention

The present invention relates to a carrier for use in carrying items externally on a vehicle. One example of such a carrier is a cycle carrier, by means of which bicycles may be transported using a vehicle which is unable to accommodate the cycles inside it.

2. Description of Related Art

Traditionally, bicycles are carried in this manner on the roof of a vehicle within one or more racks which hold them upright. This is still a manner carrying favoured by professional cycling teams since it enables the bicycles to be carried "road ready" and therefore enables their deployment relatively rapidly. Such a carrying system, however, possess the disadvantage that the or each bicycle must be lifted on to the roof of the car and then secured in a manner which is sufficiently reliable to prevent the bicycle falling off as the car moves. These considerations are not apt to be problematic for professional cycling teams, where the bicycles are very light and the vehicles carrying them in the course of a race, travel on closed roads, and at relatively low speeds (compared to normal traffic circulation on motorways, for example).

For domestic use, however, an alternative kind of carrier has evolved which attaches typically to the rear of a vehicle and provides a rack which extends away from the vehicle, rearwardly, and from which cycles may then be suspended. Typically, carriers of this kind are retained on the vehicle by means of one or more retaining straps which pull against the edge of, for example, the edge of the vehicle boot of some other surface on the vehicle. Such carriers have the advantage that no special features are required on the vehicle in order to enable them to be used on it. The corollary to this, however, is that, in order to be generically useable on a wide variety of vehicles shapes and geometries, a user will have to undertake significant set-up activity and adjustment of the carrier in order to fix it to the vehicle.

SUMMARY OF THE INVENTION

Embodiments of the present invention provide a plurality of design aspects of a carrier for both domestic and other use, for carrying items externally on a vehicle. Typically, but not exclusively, the items are bicycles but may equally be any other kind of item which is too large to accommodate within the vehicle and which may also safely be carried on a carrier externally of it.

One embodiment of the present invention provides a carrier for use in carrying items externally on a vehicle having: a rack upon which the items may be mounted which, in use, is supported by the vehicle in such a manner that the rack extends away from the vehicle and that the weight of the rack and any items carried thereon bears against the vehicle; a plurality of straps, each connected at a proximal end to the rack and having, at a distal end, a catch to enable engagement of the strap with the vehicle, each of the straps having adjustable tension; wherein the carrier further comprises, in respect of at least one of the straps, a tension indicating device adapted to display an indicium to a user indicative of the tension in the strap.

Preferably, the indicium is adapted to indicate when the tension in the at least one strap is at a recommended level. In a preferred embodiment the tension-indicating device comprises an indicium-carrying surface movably mounted upon the rack. In yet a further preferred embodiment the indicium carrying surface bears against the strap such that increased tension in the strap acts to displace the indicium carrying surface. In yet a further preferred embodiment the indicium carrying surface is biased against the strap. A preferred feature of each of the foregoing embodiments provides that the indicium carrying surface is pivotally mounted on the rack.

A further embodiment provides a carrier for use in carrying items externally on a vehicle having: a rack upon which the items may be mounted which, in use, is supported by the vehicle in such a manner that the rack extends away from the vehicle and that the weight of the rack and any items carried thereon bears against the vehicle; a plurality of straps, each connected at a proximal end to the rack and having, at a distal end, a catch to enable engagement of the strap with the vehicle, each of the straps having adjustable tension; wherein the carrier includes a load-bearing member mounted pivotally at a proximal end thereof on the rack, wherein pivotal adjustment of the position of the distal end of the load-bearing member relative to the rack enables variation of the angle of the rack relative the vehicle.

Preferably, the proximal end of the load bearing member engages with the rack by means of mutually-engagable detents which are engagable and disengagable axially with respect to pivoting axis of the load bearing member. In a preferred embodiment the detents are biased out of mutual engagement and a release mechanism acting between the rack and the member is operable to engage the detents against the biasing action. In a further preferred embodiment the detents are provided by mutually engageable teeth on the load bearing member and rack, thereby to enable mutual engagement thereof at a plurality of relative angular displacements. A preferred feature of all of the foregoing provides a carrier further comprising a vehicle type indicator which indicates to a user ranges of relative angular displacement of the rack and the load-bearing member which are suitable for different vehicle genus upon which the carrier is to be employed. One preferred features is that the vehicle type indicator comprises a scale on one of the rack and load-bearing member and a pointer mounted for rotation with the other of the rack and load-bearing member.

Aspects of the present invention are set out in the accompanying Claims.

BRIEF DESCRIPTION OF DRAWINGS

Embodiments of the invention will now be described, by way of example, and with reference to the accompanying drawings in which:

FIGS. 9*a* and 9*b* illustrate the operation of the mechanism shown in detail in FIG. 7.

FIG. 10 shows a further detail of the part illustrated FIG. 6;

DESCRIPTION OF PREFERRED EMBODIMENTS

Figure 1:
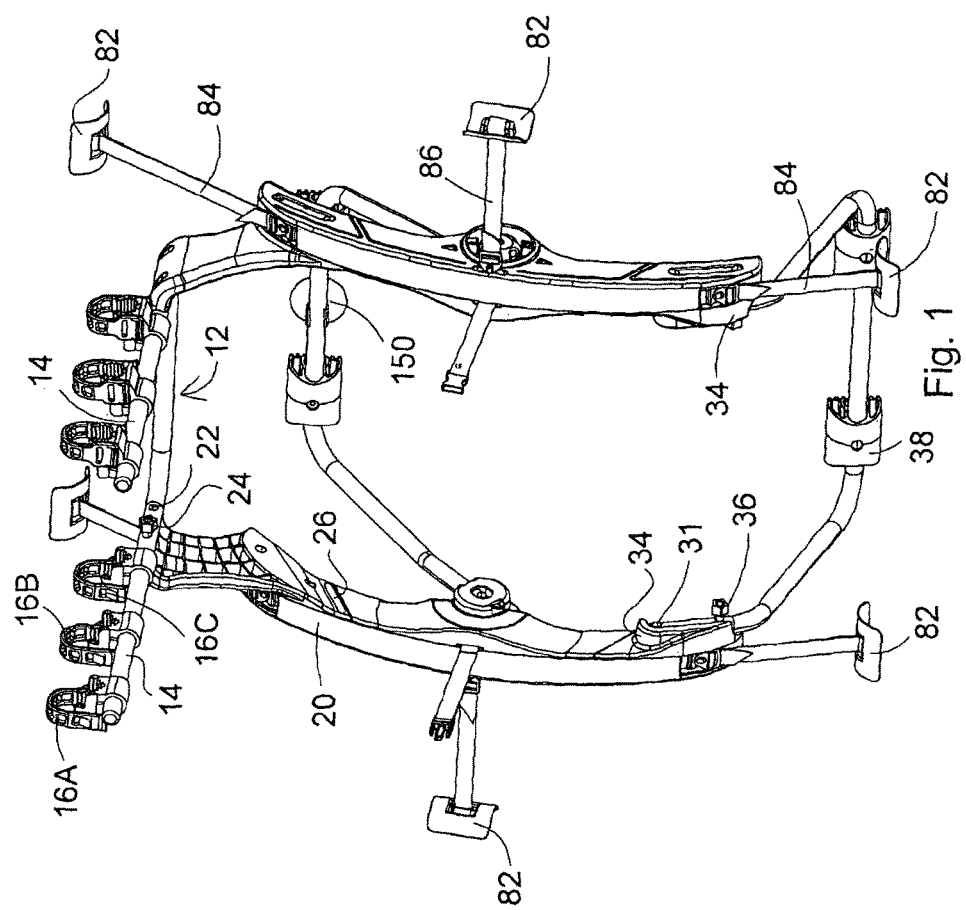
FIG. 1 is a perspective view of a carrier according to an embodiment of the present invention.

Referring now to FIG. 1 a cycle carrier includes a rack 10 which, in the present embodiment, has a U-shaped rod 12 having two outwardly projecting limbs 14 which, when the carrier is in use and mounted on a vehicle, extend away from the vehicle. Bicycles or other items are suspended from the limbs 14 of the rack 12 and retained in mutually adjacent pairs of straps 16*a-c*. The U shaped rod 12 of the rack is mounted, on each side, at the base of each of the limbs 14 on a support frame 20 via pivots, which in the present embodiment are provided by bolts 22 (see FIG. 2), which, together with releasable fastening bolts 24, retain the tube 12 on the frames 20. When the bolts 24 are disengaged, the tube 12 is pivotable about the pivots, thereby to enable it to be folded flat relative to the support frame 20.

In the present example, the support frame is constructed of rigid, moulded plastics material. In the illustrated embodiment, the support frames 20 and the U shaped tube 12 which is rigidly mounted on them (and thereby additionally serves to connect the frames, indirectly, to each other) together provide the rack 10 of the carrier. Typically, when the rack is properly mounted on a vehicle, the limbs will extend upwardly and horizontally from the vehicle at an angle of approximately 25° to the ground to enable suspension of items from them and yet, secure retention thereon. The correct attitude of the rack is evidenced when an attitude indicium, here having the form of a horizontal line 26 marked on the frame 20, provides the appropriate indication; in this embodiment this is when the line 26 is approximately horizontal.

The rack 10 is supported against the external surface of a vehicle upon which it is mounted by means of upper and lower supporting limbs 30, 32 respectively, each provided in the illustrated example by a U-shaped strut (which may typically be of steel or aluminium or any other suitably rigid, light material). The lower supporting limb 32 is pivotable on the frames 20 (to enable folding of the limb 32 flat with the frames 20) about pivots at the free ends of the lower limb 32 in this embodiment provided by bolts 31. The free ends of the lower supporting limb 32 are retained, in operation, against flanges 34 in the lower part of each of the support frames 20 by bolts 36, captive within the limb 32, and which project into the respective frame 20. To avoid damage to vehicle paintwork, a pair of soft, rubber feet 38 are mounted on the horizontal point of the limb 32 and, in use, bear against the surface of the vehicle in a manner which minimises any abrasion of the paintwork as a result of the consequent pressure. Typically, in use, the feet 32 of the lower supporting limb 38 bear against the rear of the vehicle, typically above the bumper on the base of the boot or hatch, though this is not an essential feature of the carrier.

Figure 2:
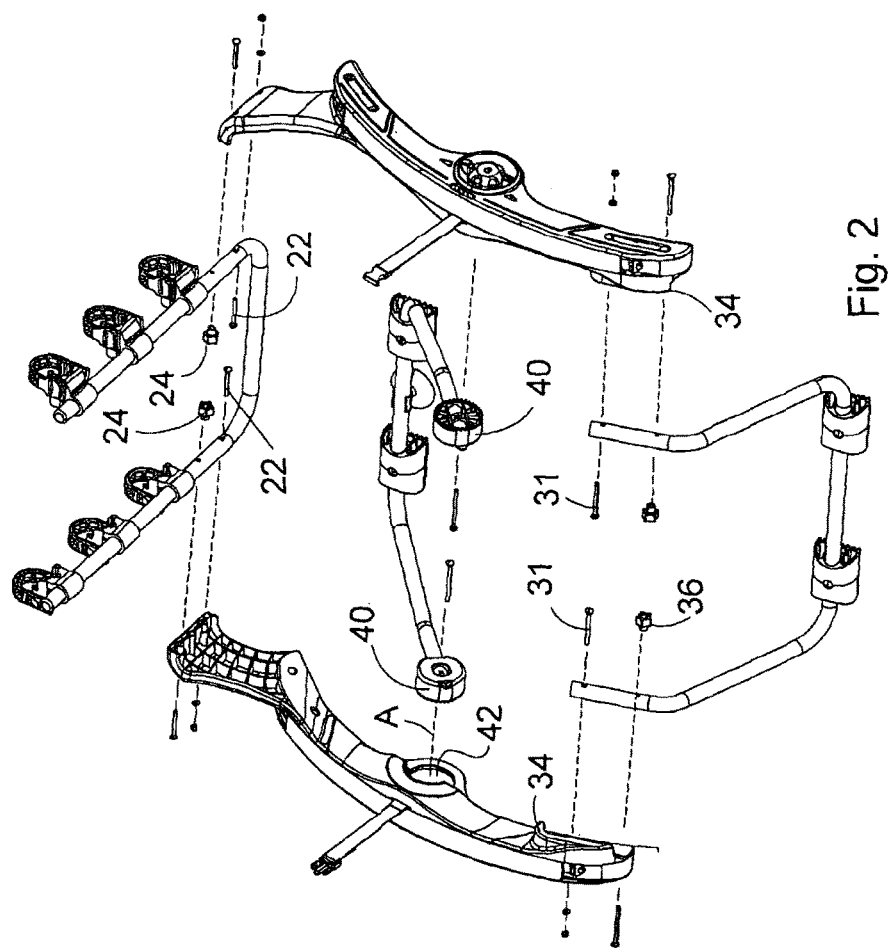
FIG. 2 is an exploded perspective view of the carrier of FIG. 1.
Figure 3:
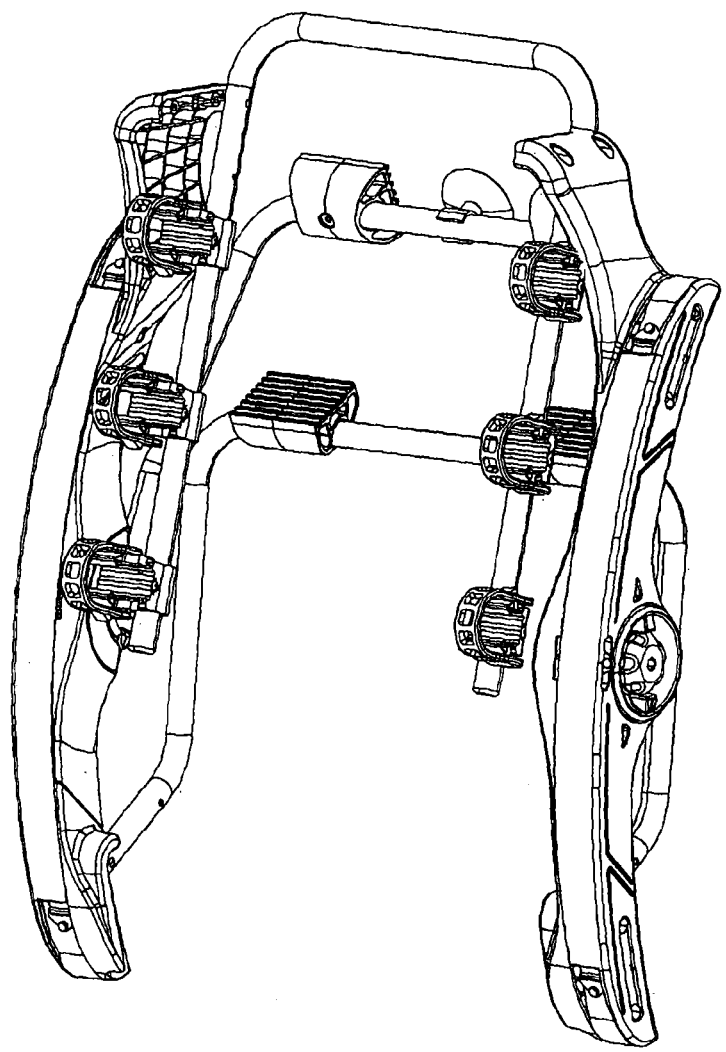
FIG. 3 is a perspective view of the carrier of FIGS. 1 and 2 in a folded state.
Figure 4:
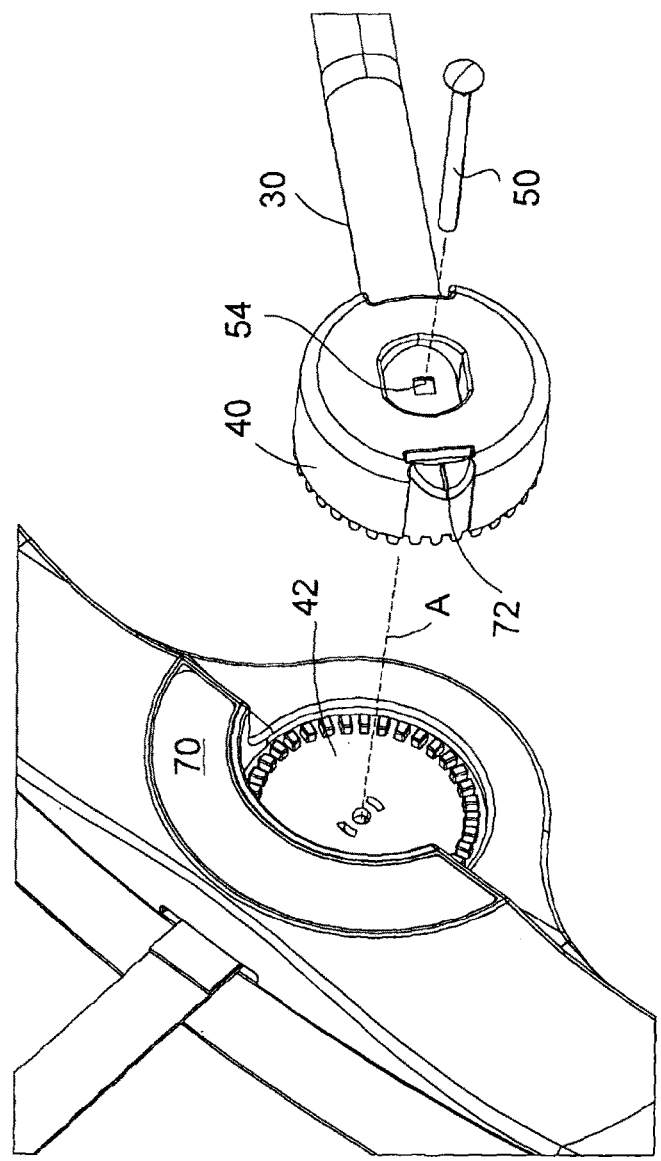
FIG. 4 shows a detail of FIG. 2.
Figure 5:
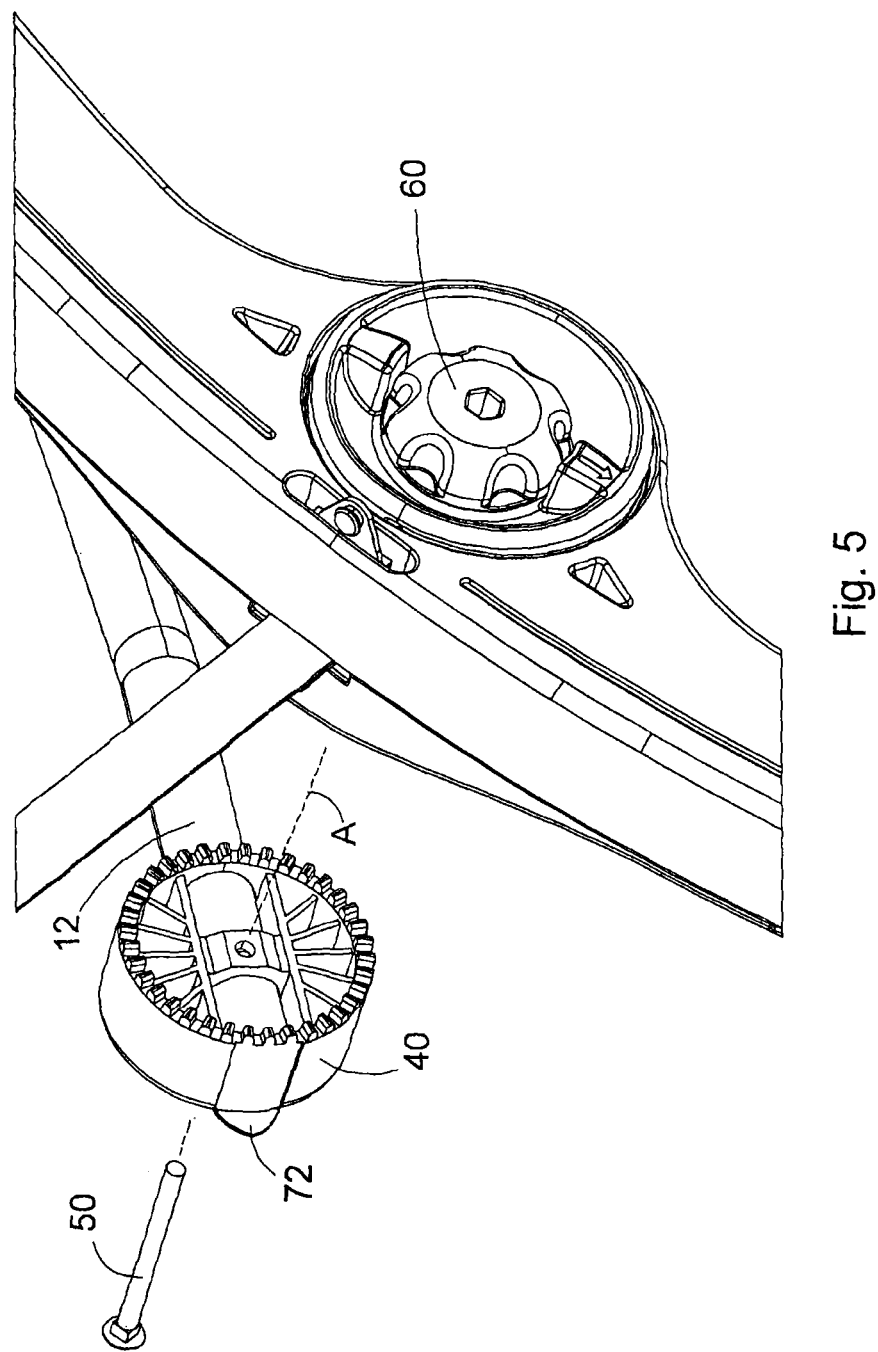
FIG. 5 shows a further detail of FIGS. 1 and 2, related to the detail shown in FIG. 4.

The upper supporting limb 30 is pivotally mounted to the rack which therefore enables adjustments of the angle at which the upper limb 30 projects away from the frames 20 and, consequently, the attitude of the limbs 14 of the rack. Suitable adjustments of the pivoting angle of the upper supporting limb 30 therefore enables the outwardly projecting limbs 14 to extend at the recommended angle of 25° to the horizontal. Referring now additionally to FIGS. 2, 4 and 5 each end of the supporting limb 30 carries a circular, moulded plastic gear-toothed member 40. The teeth of the two gear-toothed members 40 project, with reference to the pivoting axis A of the upper supporting limb 30, axially and are adapted to engage with correspondingly-configured teeth moulded into pivot sockets 42 in each of the inner faces of the frames 20. Thus, when the teeth on the members 40 are brought into engagement with the teeth in the pivot socket 42 the upper supporting limb 30 becomes fixed to the rack; when the gear-toothed member 40 and sockets 42 are disengaged, the angular position of the upper supporting limb 30 may be adjusted about a pivot provided by coach bolts 50 extending through operating 52 in the frames 20. The geometry of the upper supporting limb 30 is selected such that, when the in a relaxed state (i.e. no force is applied to it) the teeth of gear members 40 are axially disengaged from the teeth of the socket 42, thereby to enable relative rotation of the upper supporting limb 30 relative to the rack and, consequently, adjustment of the position of the supporting limb 30. The teeth on the gear members 40 and pivot socket 42 are brought into engagement by means of the bolts 50 which project through the apertures 52 in the frame 20. on the frame 20 to engage with a screw-threaded bore in a coarsely knurled wheel 60. The square section at the head of the coach bolts 50 engages with corresponding detents 54 in the limbs 14 through the centre of gear-toothed members 40, so that bolts 50 are captive against rotation within the upper limbs 30. Rotation of the wheel 60 therefore causes the bolt 50 to bring the teeth of respective gear member 40 and socket 42 into mutual engagement against the action of the bias force acting to disengage the two sets of teeth, and thereby locks the relative angular position of the upper supporting limb 30 and the rack. In the illustrated example the disengaging biasing force, acting to cause the two sets of teeth to disengage and therefore enable adjustment, is provided by the innate geometry of the limb 30, since its ends are formed to be slightly too close together to allow engagement of the teeth—without some additional force. Other forms of biasing force may be used (whether to bias the teeth into or out of engagement).

Figure 12:
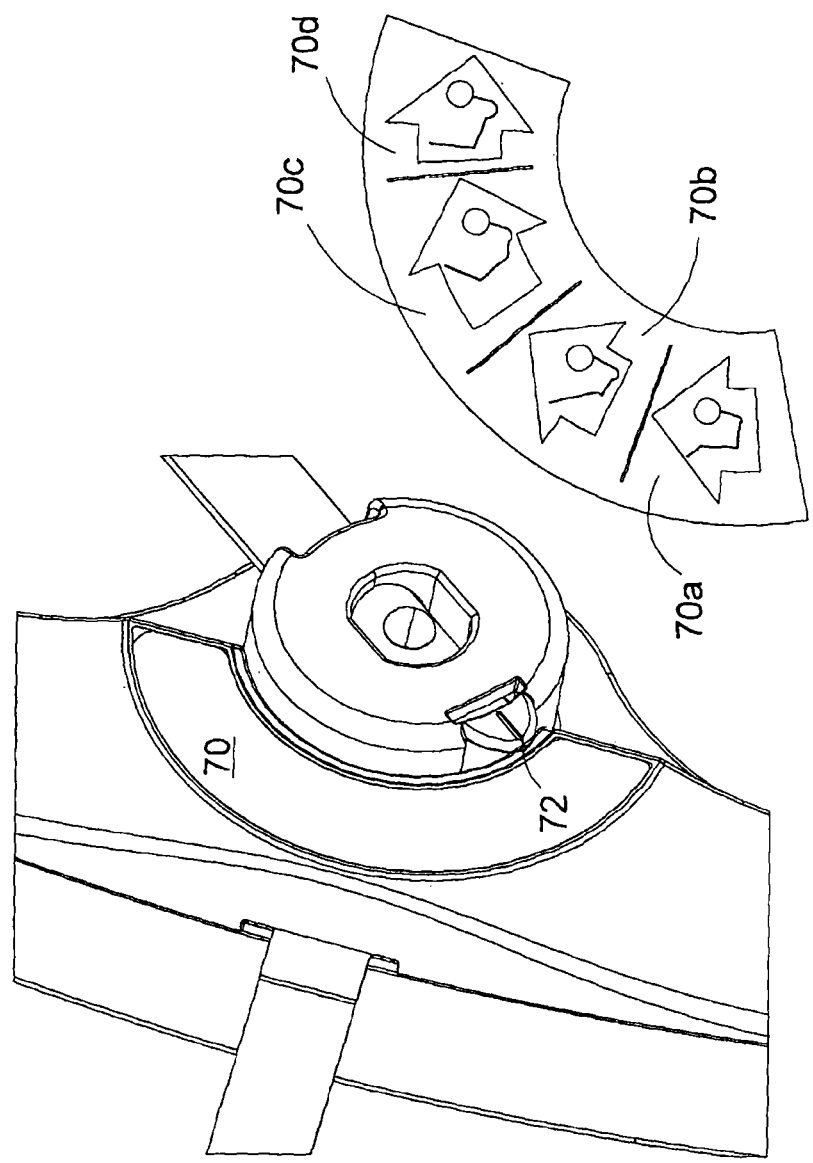
FIG. 12 shows a detail relating to the operation of the elements shown in FIGS. 4 and 5.

The precise angular position of the upper supporting limb 30 relative to the rack is selected in dependence upon the type of vehicle upon which the carrier is to be used. Thus, for example, the carrier may be amounted to a conventional saloon in which the feet 38 on the upper supporting limb 30 bear against the vehicle in a substantially vertical direction, (the rear boot of a saloon being horizontal) which will mean that the upper supporting limb 30 must have a relatively large angular displacement relative to the rack. By contrast, the carrier may equally be mounted to a hatchback vehicle whereby the feet on the upper supporting limb 30 bear against the vehicle in a much more upright direction which, in order to ensure that the tube 12 of the rack then extends substantially horizontally with respect to the ground, requires that the upper supporting limb 30 has a much lower angular displacement. Referring now additionally to FIG. 12, a preferred embodiment of the present invention includes a 'vehicle type' indicator 70 mounted to the inner faces of one or both of the supporting frames 20. The indicator 70 extends around the pivoting socket 42 and includes images of different vehicles geometries and thus, the image 70a is that of a conventional saloon, 70b is of an old style hatchback vehicle with a lower angle rear window, 70c is of a hatchback vehicle with a much more vertically-inclined rear window, and 70d illustrates a vehicle with a vertical rear window. A pointer 72, connected to the gear toothed member 40 acts to indicate vehicle type for which the current position of the upper supporting limb 30 is suitable and thereby enables a user to make a relatively coarse adjustment of the angle of the upper supporting limb 30 relative to the rack before fastening, or attempting to fasten the carrier to the vehicle at all.

Figure 6:
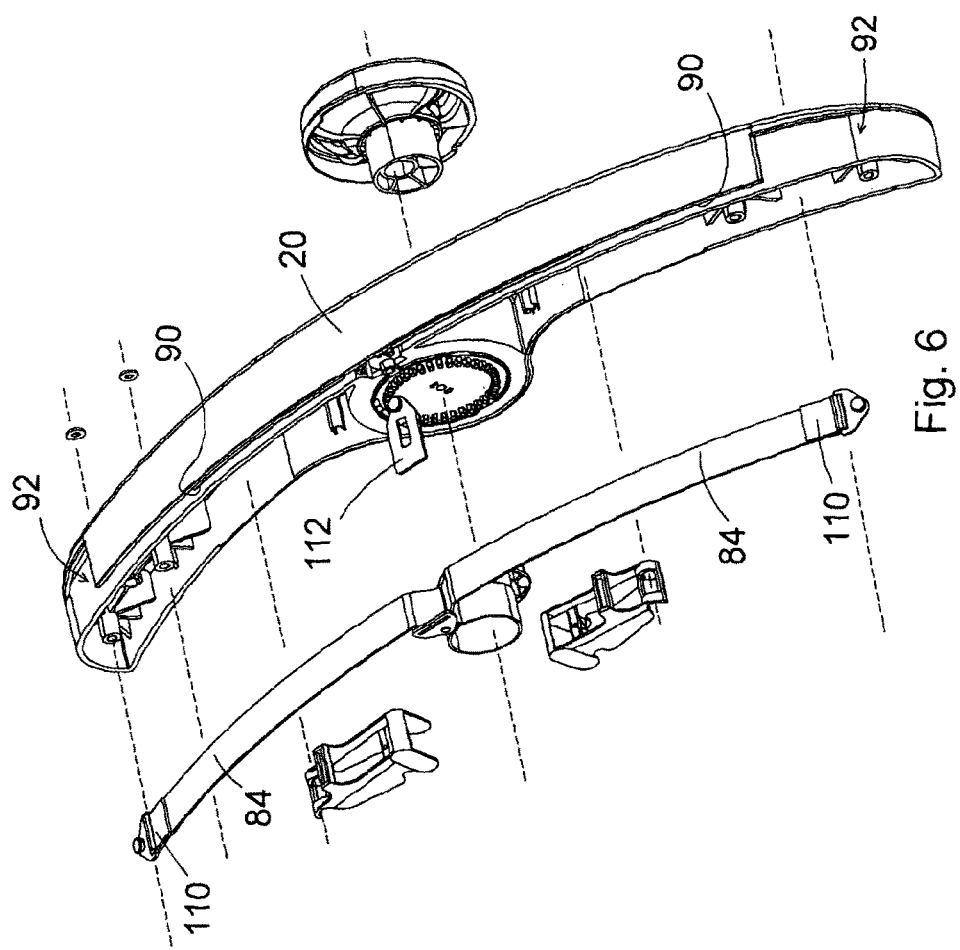
FIG. 6 is an exploded perspective view of a detail of the carrier of FIGS. 1 and 2.

The carrier is retained upon the vehicle by means of six straps 84, 86. Each of the straps is anchored, at its proximal end, on a support frame 20 and has, at its free distal end, a catch 82 which is designed to engage with a surface on the vehicle upon which the carrier is to be retained. Each of the support frame 20 supports three straps; two oppositely-extending vertical straps 84, and a single horizontally extending strap 86. Referring additionally to FIG. 6 the vertical straps 84 extend from located within the central part of support frame 20, and then upwardly and downwardly within the support frame 20 along channels 90 whereupon they then project out of the support frame 20 via apertures 92. In the present example both vertical straps are formed from a single web of material which is wound once around the anchoring sleeve 88 and stitched together where the two ends meet an anchoring sleeve 88. Thereafter, the straps are further stitched together at a point a little above that. Subsequently, the two elements of the web are then free to extend in their mutually opposing upward and downward directions within the channel 90 passing over guide rollers (not shown) as they do so. The anchoring sleeve 88 is mounted within the support frame, eccentrically upon a central shaft 100 which extends coaxially with the engaging bolt 50. The shaft 100 may be rotated by a wheel handle 102 which extends annularly around the knurled wheel 60. Rotation of the wheel handle 102 therefore results in an eccentric rotation of the anchoring sleeve 88 which, in turn causes it to execute an arcuate displacement.

Figure 9A:
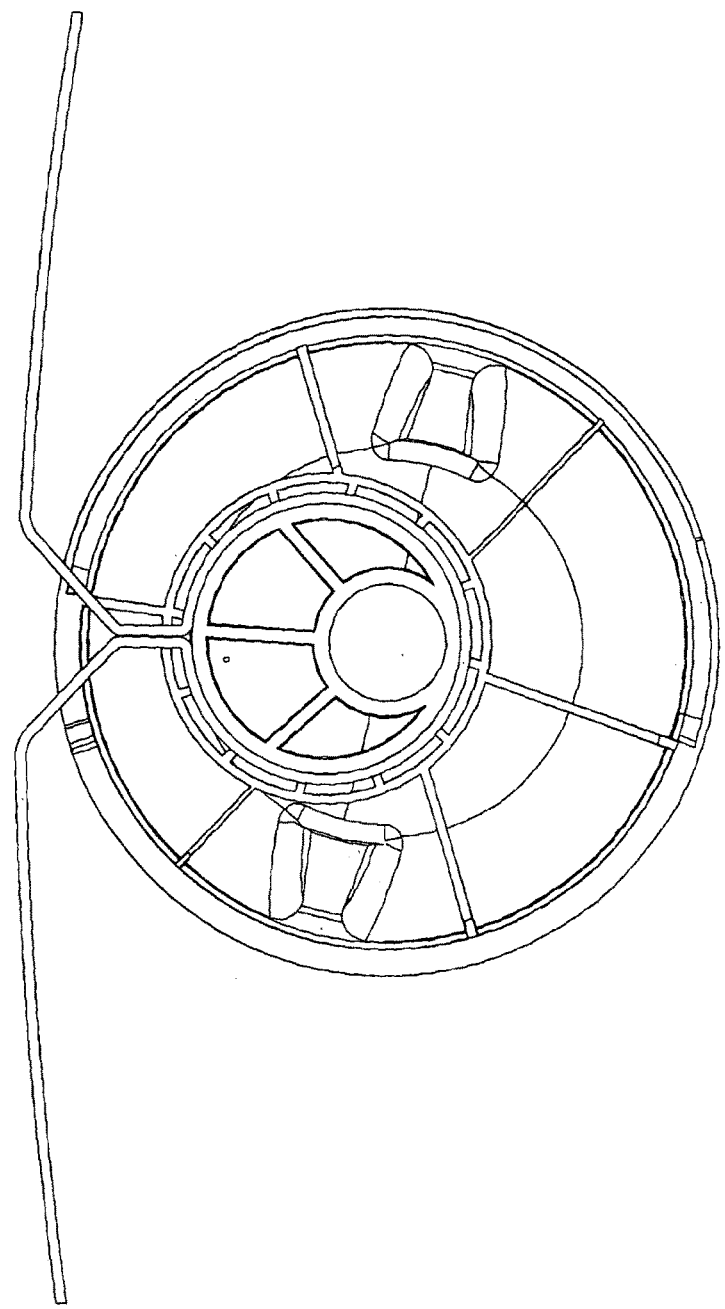
Figure 11A:
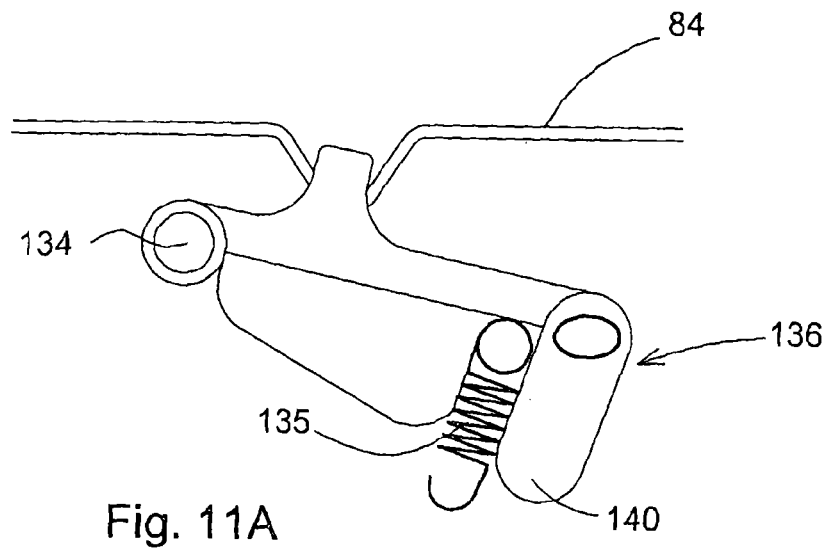
FIGS. 11*a* and 11*b* illustrate the operation of a detail of FIG. 6.
Figure 11B:
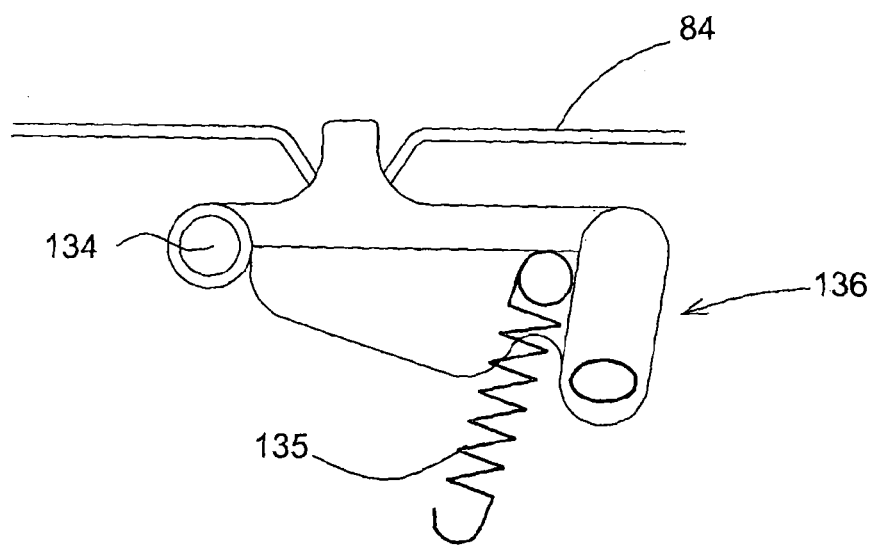

As is shown clearly in FIGS. 9a and b, this arcuate displacement results in a net translational, diametric displacement of the anchoring sleeve 88 illustrated in the transition from the position shown in FIG. 9a to the position shown in FIG. 9b. This diametric displacement causes a retraction of the straps 84 by a distance equal to the displacement and thus tightening of the straps 84. An initial coarse adjustment of the straps can be performed by engaging the catches with suitable surfaces on the vehicle and then reducing their effective length using the traditional buckles 110 at their distal ends. Subsequently, the wheel handle 102 can then be rotated to cause the translational displacement of the anchoring sleeve 88 and consequent tightening of the straps.

Referring again to FIG. 5 and additionally to FIG. 10, the horizontal strap 86 is anchored at its proximal end to a mounting plate 112 is contained to more linearly within guides 108 and which extends through an ob-round aperture 114 in the outer side wall of the frame 20. A cam plate 116 depends downwardly from the mounting plate 112 and into a helical groove 120 located around the outside circumference of the handle wheel 102. The cam plate 114 is retained in position within the groove 116 by the action of the guides 108. The surface of the groove 120 within the circumference of the wheel handle 102 acts as a cam to displace the cam plate 114 and thereby the mounting plate 112 in an axial direction along the guides 108 upon rotation of the handle wheel 102. This therefore causes retraction of the mounting plate 112 into the ob-round recess 114 and consequently, a tightening of the horizontal strap 86. Rotation of the wheel handle 102 in addition to causing a translational displacement of the mounting cylinder 88 and consequent tightening of the vertical straps 84, therefore additionally causes a translational displacement by virtue of the action of the cam provided by groove 120 upon the mounting plate 112 to cause tightening of the horizontal strap 86. Thus a coarse adjustment of the horizontal strap 86 followed by rotation of the handle wheel 102 will then create a final tightening of that strap to secure the carrier upon the vehicle.

Figure 7:
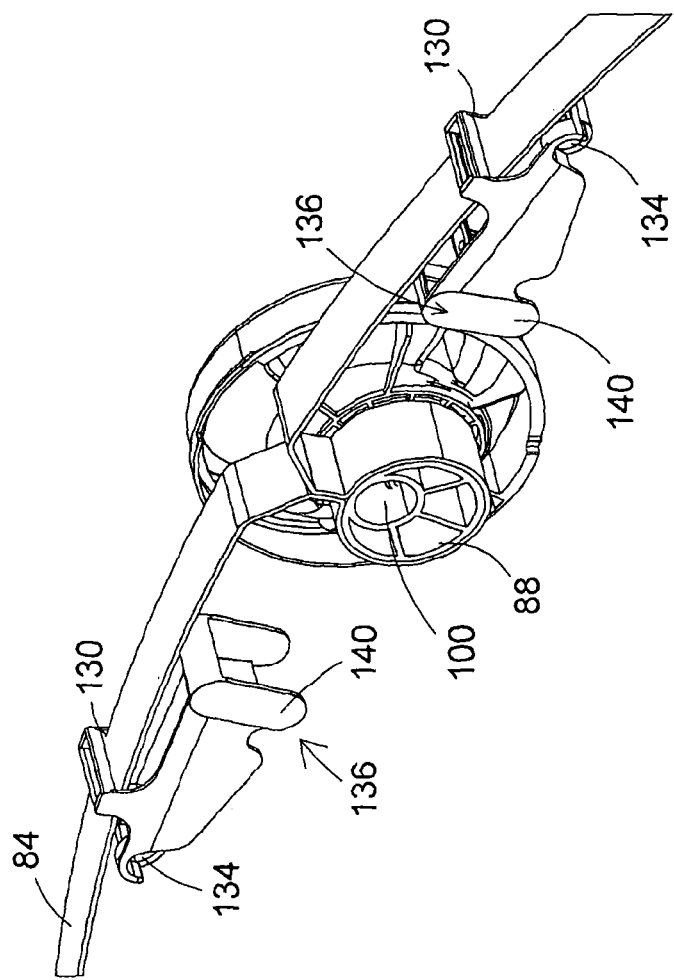
FIG. 7 is a perspective view of elements of the detail shown in FIG. 6.
Figure 8:
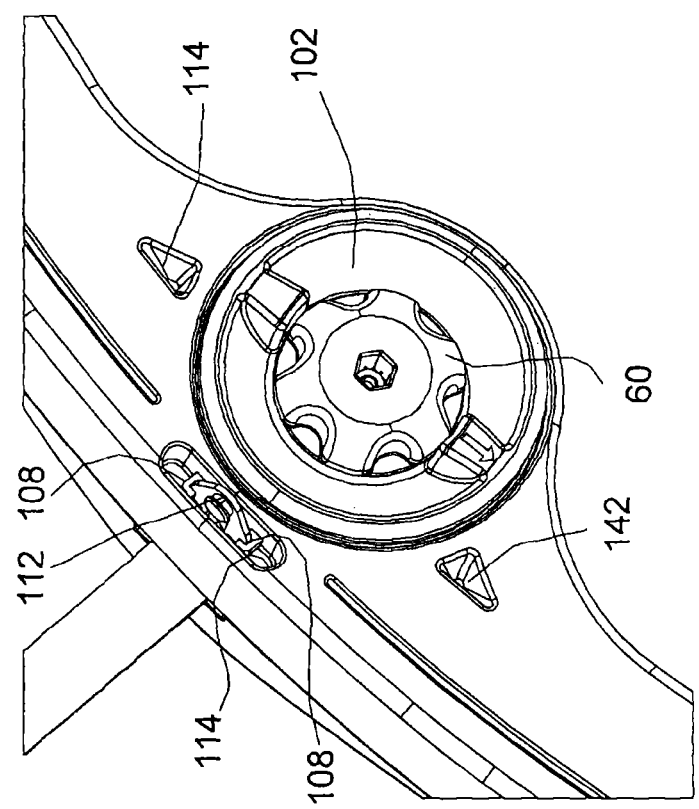
FIG. 8 is a side view of the detail of FIG. 6.

Traditionally, users have shown themselves to be poor judges of the appropriate levels of tension which should be applied in order to ensure that the carrier is safely retained upon a vehicle. A further embodiment of the present invention provides an indicium of the tension within the straps. Referring again to FIG. 7, each of the vertical straps 84 passes under a loop member 130 within a tension indicating device 132. The tension indicating device is pivotally mounted with respect to the frame support 20 a pivot point 134 and is biased by a compression spring 135 in a downward direction so that the loop 120 applies a downward force upon the respective strap 84. Thus, as the tension in the strap increases, the free pivoting end 136 of the tension indicator is urged upward (see FIGS. 10a and b) against the action of the biasing spring 135. It follows that the extent of upward pivotal displacement of the tension indicator about pivot point 134 is a measure of the tension within the straps 84. The free pivoting end 136 of the indicator carries a surface 140 upon which a chromatic indicium is located having, at least, a green area at the bottom, an amber area at the middle and a red area at the top. The indicium surface 140 is located in register with a corresponding window 142 in the support frame 20 (see FIG. 7) so that, when the wheel handle 102 is tightened causing full tightening of the vertical straps 84, the extent of the tension in the straps when tightened is demonstrated pivoting displacement of the free end 136 which, in turn, is shown by the colour of the indicium surface lying in register within the window. Where the colour is green this indicates high upwards pivoting displacement of the tension indicator about pivot point 130 and, accordingly, a safe tension for retaining the carrier upon the vehicle; by contrast if the colour is red or amber this indicates a degree of pivoting displacement (and therefore tension within the strap) which is insufficient in order safely to retain the carrier on the vehicle.

Any further modification, the wheel handle is connection to a mounting cylinder which is concentrically mounted with the shaft of the wheel handle, and the straps are fixedly mounted to that shaft in such a manner that rotation of the wheel handle (possibly via intermediate gears, as appropriate) causes the straps to wrap around the mounting cylinder and thereby increase the tension within the straps. Suitably, a ratchet and pull arrangement may be provided in order to prevent unwanted counter rotation as a result of tension within the strap, which can then be release by a suitable detent release.

In yet a further modification a sucker 150 is provided on the upper supporting limb 30 of the carrier in order temporarily to locate the carrier upon the vehicle (though this would necessitate that the carrier is not carrying any items at the time) thereby to enable more precise adjustment of the angular displacement of the upper support member relative to the wrack and also of the various strap lengths using the manual buckles. The various modifications described herein are not necessarily limited to association with the embodiments in connection with which they were first described and each modification may suitably find appropriate application with each embodiment.

Figure 13:
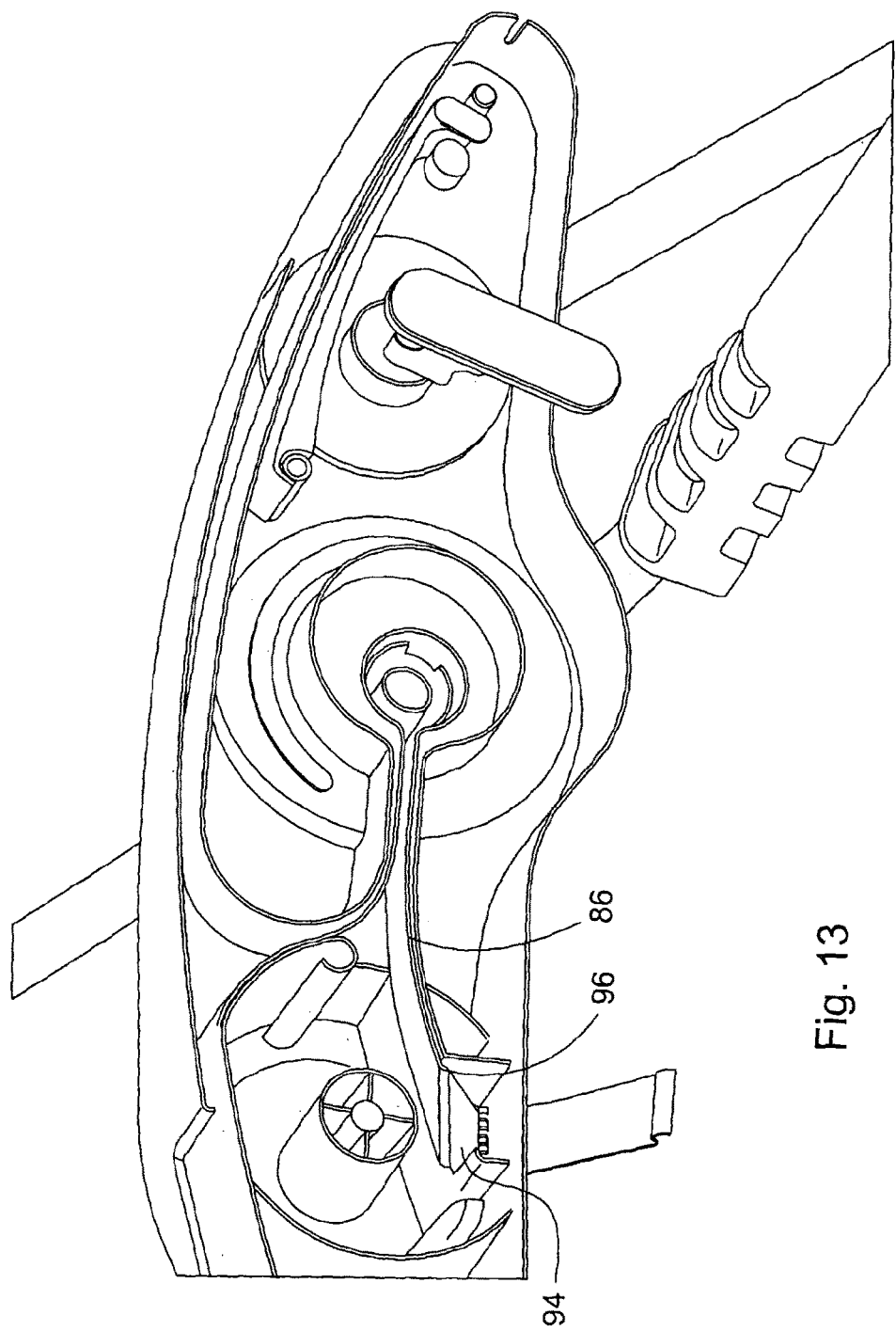
FIG. 13 shows detail regarding an alternative embodiment of a portion of a carrier.

In yet a further modification, shown in FIG. 13, the strap 86 is also connected to the anchoring sleeve 88 and extends initially therefrom parallel with the straps 84 (which, in this modification both extend, together with the strap 86, initially in the same direction before one is routed back upon itself). Thereafter, the strap passes out of the support frame 20 through an aperture 94 and via an angled guide surface 96 which enables the strap 86 to change direction and so extend horizontally so that it may engage the vehicle at a suitable point to provide lateral stability.

In yet a further modification, the upwardly extending strap is simply a fixed, non-retractable strap which, in operation, is preferably engaged initially with the weight of the rack then being carried by both such straps. The horizontal straps 86 and downwardly extending straps 84 are tightened by actuation; in the illustrated example of FIG. 13, for example, rotation of the wheel handle 102 to cause displacement of the anchoring sleeve 88.

The invention claimed is:

1. A carrier for use in carrying items externally on a vehicle comprising:
   a rack upon which the items are adapted to be mounted which, in use, is supported by the vehicle in such a manner that the rack extends away from the vehicle and that a weight of the rack and any items carried thereon bears against the vehicle; and
   a plurality of straps, each connected at a proximal end to the rack and having, at a distal end, a catch to enable engagement of the strap with the vehicle, wherein
   tension in a pair of the straps is simultaneously adjustable by a movable handle located on the rack, proximal ends of the pair of straps being fixedly connected to an anchoring member, the anchoring member having a cylinder concentrically mounted with a shaft and the pair of straps extending therefrom in opposing direction, wherein motion of the handle causes an eccentric rotation of the cylinder of the anchoring member allowing retraction of each strap of the pair.

2. The carrier according to claim 1, wherein the anchoring member is movable relative to the rack and movement of the handle causes relative movement of anchoring member and rack.

3. The carrier according to claim 1, wherein the pair of straps extend from the rack in directions which are non-parallel to each other.

4. The carrier according to claim 3, wherein the pair of straps are formed from a single web of material.

5. The carrier according to claim 1, wherein the handle is rotatable.

6. The carrier according to claim 1, wherein the handle is rotatable to cause the pair of straps to wrap around a spool thereby to retract each of the straps.

7. The carrier according to claim 6, further comprising a ratchet and gear arrangement located on the rack and spool to prevent tension in the strap causing rotation of the spool.

8. The carrier according to claim 2, wherein at least one of the anchoring members is movable translationally with respect to the rack and rotation of the handle causes translational movement of the at least one anchoring member with respect to the rack.

9. The carrier according to claim 8, wherein the at least one anchoring member is mounted on the shaft for the eccentric rotation relative to an outer circular portion.

10. The carrier according to claim 8, wherein the at least one anchoring member is substantially cylindrical and at least one of the pair of straps extends around the at least one anchoring member.

11. The carrier according to claim 10, wherein the eccentric rotation of the anchoring member is through substantially 180°.

12. The carrier according to claim 8, wherein the handle rotates a cam surface and the at least one anchoring member bears against the cam surface such that rotation of the cam surface causes translation of the at least one anchoring member thereby to retract and extend the adjustable strap.

13. The carrier according to claim 12, wherein rotation of the handle causes translation and rotation of the at least one anchoring member.

14. The carrier according to claim 1, wherein the straps extend generally parallel to a direction in which the weight of the rack bears and laterally to the direction in which the weight of the rack bears.

15. The carrier according to claim 1, the tension indicator comprises an indicium carrying surface movably mounted upon the rack.

16. The carrier according to claim 1, further comprising a locator to allow an adjustment of an upper support member relative to the rack.

* * * * *